Patented Jan. 3, 1939

2,142,140

UNITED STATES PATENT OFFICE 2,142,140

SALTS OF BETA-ALKYLATED-CHOLINE-ALKYL-ETHERS AND PROCESS FOR THEIR PRODUCTION

Randolph T. Major, Plainfield, and Joseph K. Cline, Woodbridge, N. J., assignors to Merck & Co., Inc., Rahway, N. J., a corporation of New Jersey No Drawing. Original application August 12, 1932, Serial No. 628,548. Divided and this application January 17, 1936, Serial No. 59,546

6 Claims. (Cl. 260—614)

This is a division of our co-pending application Serial Number 628,548, filed August 12, 1932, now Patent Number 2,049,463.

This invention relates to processes for the production of salts of beta-alkylated-choline-alkyl-ethers, compounds suitable for therapeutic use. In general, such processes are concerned with the addition of trimethylamine to alpha-alkyl-beta-bromoethyl-alkyl ethers. The alpha-alkyl-beta-bromoethyl-alkyl ethers were prepared in the manner described by Swallen and Boord, J. A. C. S., 52, 651 (1930).

These beta-alkylated-choline-alkyl ether salts have not been described in the literature previously. Their general formula is

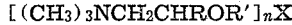

$$[(CH_3)_3NCH_2CHROR']_nX$$

where X is an acid radical, $n$ is its valance and R and R' are alkyl groups such as methyl, ethyl, propyl, butyl, etc. Compounds of the choline alkyl ether type where R is a hydrogen atom have been described by H. H. Dale, J. Pharmacol. 6, 147 (1914), and A. J. Ewins, Biol. J. 8, 44 and 209, 366–73 (1914).

For the preparation of the beta-alkylated-choline-ethers, the following will serve as an example.

*Example 1.* — Alpha-methyl-beta-bromoethyl-ether is heated with the equivalent amount of a 33% solution of trimethylamine in benzene for a period of twelve hours at 100° C. The resultant reaction product is a more or less discolored crystalline mass. This is dissolved in absolute alcohol and the solution decolorized with activated charcoal. The charcoal is removed by filtration. In order to precipitate the product completely, the alcoholic filtrate is evaporated to small volume and anhydrous ether added. Beta-methyl choline-bromide-ethyl-ether precipitates as a microcrystalline white hygroscopic powder, soluble in alcohol and water, insoluble in ether and benzene, but slightly soluble in ether containing a small amount of alcohol. Melting point 130°–132° C. On standing, the compound becomes slightly discolored.

The beta-methylcholine-chloride-ethyl-ether is prepared by shaking an alcoholic solution of beta-methylcholine-bromide-ethyl-ether with a slight excess of silver chloride. When the reaction is completed (in about 15 to 20 minutes with a solution of 50° C.), the silver chloride and silver bromide are filtered off and the filtrate treated with hydrogen sulphide. The small amount of silver sulphide which precipitates is removed with activated charcoal, and the charcoal removed by filtration. The clear filtrate is then evaporated to remove the excess of alcohol. To the small volume remaining, anhydrous ether is added. The beta-methylcholine - chloride - ethyl - ether precipitates out as a pure white microcrystalline hygroscopic powder soluble in alcohol and water, insoluble in ether and benzene, but slightly soluble in ether containing a small amount of alcohol. It has a melting point of 132–134° C.

*Example II.*—Alpha-propyl-beta-bromoethyl-ethyl-ether is heated with the equivalent amount of a 33% solution of trimethylamine in benzene for a period of 16 hours at 118° C. The product of the reaction is removed from the vessel in which it has been heated and the benzene removed by evaporation. The oil which remains is then allowed to crystallize and is dissolved in cold chloroform. Any insoluble portion consisting of tetramethylammonium bromide is removed by filtration. Anhydrous ether is added to the filtrate, and the beta-propyl-choline bromide-ethyl-ether precipitates as a microcrystalline white powder soluble in alcohol, water, chloroform and ethyl acetate, slightly soluble in benzene and ether containing small amounts of alcohol, but insoluble in ether and petroleum ether. Melting point 147–149° C.

Beta-propylcholine-chloride-ethyl-ether is prepared by shaking an alcoholic solution of beta-propylcholine-bromide-ethyl-ether with a slight excess of silver chloride. When the reaction is complete (in 15 to 20 minutes at 50°–60° C.), the silver chloride and silver bromide are filtered off and the filtrate treated with hydrogen sulphide. The small amount of silver sulphide which is precipitated is then removed with activated charcoal. The charcoal is removed by filtration and the filtrate evaporated to remove the alcohol. Chloroform is continuously added during the evaporation so that the alcohol will be gradually displaced by chloroform. To the clear chloroform solution, anhydrous ether is added. The beta-propylcholine-chloride - ethyl - ether precipitates out as a pure white microcrystalline hygroscopic powder soluble in benzene and ether containing small amounts of alcohol, but insoluble in ether. Melting point 148–150° C.

For purification of the higher members of the series, benzene may often be used to advantage as a solvent. Solutions in benzene are added to anhydrous ether to effect precipitation. Direct recrystallization from ethyl acetate may also be resorted to at times, as well as ethyl acetate solutions being precipitated by the addition of anhydrous ether.

Examples for the production of other products of this series can be readily derived by reference to the tables of further examples which are given below. The procedure is analogous in every case. Substitution of the products contained in the table for each of the choline alkyl ethers prepared in accordance with the foregoing examples will suffice. For example, the given alpha-alkyl-beta-bromoalkyl-ether shown in the first column, upon reaction with trimethylamine, yields the corresponding beta-alkylcholine bromide alkyl ether given in the same line in the third column.

where R and R' are alkyl groups, X is an acid radical, and $n$ is its valence. X must, of course, be an acid radical whose silver salt is more soluble than silver bromide.

Thus, also, some of the sulphates may be prepared as, for example, the beta-methylcholine sulphate n-butyl ether, by shaking the bromide with silver sulphate in place of silver chloride, as shown in the tabulation above.

Various modifications of the general process thus outlined are obviously possible without de-

| Alpha-alkyl-beta-bromo-alkyl ether used | Formula | Beta-alkylcholine bromide alkyl ether obtained | Formula | Melting point of bromide | Melting point of chloride |
|---|---|---|---|---|---|
| Alpha-methyl-beta-bromoethyl-methyl ether. | $CH_3OCH(CH_3)CH_2Br$ | Beta-methylcholine bromide methyl ether. | $CH_3OCH(CH_3)CH_2N(CH_3)_3Br$ | 116–118° clear 123°. | 135–36° |
| Alpha-ethyl-beta-bromoethyl-methyl ether. | $CH_3OCH(C_2H_5)CH_2Br$ | Beta ethylcholine bromide methyl ether. | $CH_3OCH(C_2H_5)CH_2N(CH_3)_3Br$ | 122–124 | 101–103 in vacuo. |
| Alpha-n-propyl-betabromoethyl methyl ether. | $CH_3OCH(C_3H_7)CH_2Br$ | Beta-n-propylcholine bromide methyl ether. | $CH_3OCH(C_3H_7)CH_2N(CH_3)_3Br$ | 101–103 | 112–114 |
| Alpha-n-butyl-betabromo-ethyl methyl ether. | $CH_3OCH(C_4H_9)CH_2Br$ | Beta-n-butylcholine bromide methyl ether. | $CH_3OCH(C_4H_9)CH_2N(CH_3)_3Br$ | 98–100 | 101–103 |
| Alpha-methyl-betabromo-ethyl-ethyl ether. | $C_2H_5OCH(CH_3)CH_2Br$ | Beta methylcholine bromide ethyl ether. | $C_2H_5OCH(CH_3)CH_2N(CH_3)_3Br$ | 130–132 | 132–134 |
| Alpha-ethyl-beta-bromoethyl-ethyl ether. | $C_2H_5OCH(C_2H_5)CH_2Br$ | Beta ethylcholine bromide ethyl ether. | $C_2H_5OCH(C_2H_5)CH_2N(CH_3)_3Br$ | 159–160 | 160–162 |
| Alpha-n-propyl-betabromo-ethyl ethyl ether. | $C_2H_5OCH(C_3H_7)CH_2Br$ | Beta-n-propylcholine bromide ethyl ether. | $C_2H_5OCH(C_3H_7)CH_2N(CH_3)_3Br$ | 147–149 | 148–150 |
| Alpha-n-butyl-beta-bromoethyl ethyl ether. | $C_2H_5OCH(C_4H_9)CH_2Br$ | Beta-n-butylcholine bromide ethyl ether. | $C_2H_5OCH(C_4H_9)CH_2N(CH_3)_3Br$ | 148–149 | 132–134 |
| Alpha-ethyl-beta-bromoethyl-n-propyl ether. | $C_3H_7OCH(C_2H_5)CH_2Br$ | Beta ethylcholine bromide n-propyl ether. | $C_3H_7OCH(C_2H_5)CH_2N(CH_3)_3Br$ | 147–149 | 148–150 |
| Alpha-methyl-beta-bromoethyl-n-butyl ether. | $C_4H_9OCH(CH_3)CH_2Br$ | Beta methylcholine bromide n-butyl ether. | $C_4H_9OCH(CH_3)CH_2N(CH_3)_3Br$ | 101–103 | 100–102* |
| Alpha-ethyl-beta-bromoethyl-n-butyl ether. | $C_4H_9OCH(C_2H_5)CH_2Br$ | Beta ethylcholine bromide n-butyl ether. | $C_4H_9OCH(C_2H_5)CH_2N(CH_3)_3Br$ | 128–130 | 133–134 |
| Alpha-n-propyl-beta-bromoethyl-n-butyl ether. | $C_4H_9OCH(C_3H_7)CH_2Br$ | Beta n-propylcholine bromide n-butyl ether. | $C_4H_9OCH(C_3H_7)CH_2N(CH_3)_3Br$ | 109–112 | 95–97 |
| Alpha-n-butyl-beta-bromoethyl-n-butyl ether. | $C_4H_9OCH(C_4H_9)CH_2Br$ | Beta n-butylcholine bromide n-butyl ether. | $C_4H_9OCH(C_4H_9)CH_2N(CH_3)_3Br$ | 100–102 | (Oil) |
| Alpha-n-propyl-beta-bromoethyl-n-amyl ether. | $C_5H_{11}OCH(C_3H_7)CH_2Br$ | Beta n-propylcholine bromide n-amyl ether. | $C_5H_{11}OCH(C_3H_7)CH_2N(CH_3)_3Br$ | 105–107 | 101–103 |

*Sulphate melting point 100–102° C. The sulphate is prepared by shaking the bromide with silver sulphate in place of silver chloride The chloride of this compound was an oil.

For the transformation of the bromides to the chlorides, an additional process is possible. Example: Beta-ethylcholine bromide n-butyl ether is shaken with an excess of silver oxide in a 95% alcohol solution. The mixture is kept cool. When no more halogen ions are noted in the clear liquid, the silver oxide and silver bromide are filtered off. The solution is cooled in ice and neutralized with hydrogen chloride. Hydrogen sulphide is next added, and the small amount of silver sulphide removed with activated charcoal. The charcoal is removed by filtration, and the clear filtrate evaporated (preferably in vacuo), benzene being slowly added to aid in removing the water and alcohol. The oil remaining is dissolved in chloroform, and anhydrous ether is added to the chloroform solution. Beta-ethylcholine chloride n-butyl ether precipitates as a white, slightly hygroscopic microcrystalline powder, soluble in alcohol, water, benzene and ethyl acetate, slightly soluble in ether containing small amount of alcohol, but insoluble in ether and petroleum ether. Melting point 133–134° C.

In order to elucidate the process further, a general reaction may be written as follows:

$BrCH_2CHROR' + (CH_3)_3N \rightarrow$
$(CH_3)_3NBrCH_2CHROR'$
$n[(CH_3)_3NBrCH_2CHROR'] + Ag_nX \rightarrow$
$nAgBr + [(CH_3)_3NBrCH_2CHROR']_nX$ parting from the general spirit and scope of the invention as above outlined.

We claim as our invention:

1. The process of making salts of β-alkylated-choline alkyl-ethers which comprises reacting upon the corresponding alpha-alkyl-beta-bromoethyl-alkyl ether with trimethylamine, and then reacting upon the β-alkyl choline bromide alkyl ether thus obtained with a silver salt which is not less soluble than silver bromide.

2. Salts of β-alkylated-choline-alkyl-ethers selected from the group consisting of β-alkylated-choline-methyl-ether, and β-alkylated-choline-n-butyl ether.

3. Salts of β-alkylated-choline-methyl ether, wherein the acid radical is one whose silver salt is not less soluble than silver bromide.

4. Salts of β-butylcholine-methyl ether, wherein the acid radical is one whose silver salt is not less soluble than silver bromide.

5. Salts of beta-alkylated-choline-n-butyl ether, wherein the acid radical is one whose silver salt is not less soluble than silver bromide.

6. β-propylcholine-bromide-ethyl ether having the formula: $C_2H_5OCH(C_3H_7)CH_2N(CH_3)_3Br$ forming white hygroscopic crystals melting at about 147–149° C.

RANDOLPH T. MAJOR.
JOSEPH K. CLINE.